(12) United States Patent
York et al.

(10) Patent No.: US 10,480,900 B2
(45) Date of Patent: Nov. 19, 2019

(54) OPTICAL SYSTEM WITH CANT INDICATION

(71) Applicant: Sig Sauer, Inc., Newington, NH (US)

(72) Inventors: Andrew W. York, Portland, OR (US); Gregory Scott Smith, Portland, OR (US)

(73) Assignee: SIG SAUER, INC., Newington, NH (US)

( * ) Notice: Subject to any disclaimer, the term of this patent is extended or adjusted under 35 U.S.C. 154(b) by 297 days.

(21) Appl. No.: 15/220,254

(22) Filed: Jul. 26, 2016

(65) Prior Publication Data

US 2017/0138698 A1    May 18, 2017

Related U.S. Application Data

(60) Provisional application No. 62/197,187, filed on Jul. 27, 2015.

(51) Int. Cl.
| | |
|---|---|
| *F41G 1/44* | (2006.01) |
| *F41G 1/38* | (2006.01) |
| *G02B 27/34* | (2006.01) |
| *F41G 1/387* | (2006.01) |
| *F41G 1/34* | (2006.01) |

(52) U.S. Cl.
CPC ............... *F41G 1/44* (2013.01); *F41G 1/345* (2013.01); *F41G 1/38* (2013.01); *F41G 1/387* (2013.01); *G02B 27/34* (2013.01)

(58) Field of Classification Search
CPC ... F41G 1/44; F41G 1/345; F41G 1/38; F41G 1/387

USPC .......................................................... 42/123
See application file for complete search history.

(56) References Cited

U.S. PATENT DOCUMENTS

| | | | | |
|---|---|---|---|---|
| 3,568,324 | A * | 3/1971 | Jorczak | F41C 33/08 42/142 |
| 5,005,308 | A * | 4/1991 | Parks | F41G 1/38 33/366.21 |
| 6,978,569 | B2 * | 12/2005 | Williamson, IV | F41G 1/44 42/132 |
| 7,296,358 | B1 * | 11/2007 | Murphy | F41G 1/44 33/265 |
| 7,654,029 | B2 * | 2/2010 | Peters | F41G 1/473 356/11 |
| 7,752,798 | B2 | 7/2010 | Mayerle | |

(Continued)

*Primary Examiner* — Joshua E Freeman
*Assistant Examiner* — Bridget A Cochran
(74) *Attorney, Agent, or Firm* — Miller Nash Graham & Dunn LLP

(57) ABSTRACT

An electronic indicator on a see-through optical scope indicates whether an optical system is canted. The indicator may include illuminable visual indicators positioned on opposite sides of a field of view through the optical scope. The indicator may be visual, haptic, or aural. The visual indicator may include one or more LEDs positioned on the periphery of the field of view, and may be optically coupled to an appropriate position on the face of the reticle using a suitable waveguide. The LEDs are coupled to a microprocessor which is, in turn, coupled to a solid-state electronic inclinometer that is incorporated into the internal structure of the optical system. The microprocessor is configured to selectively illuminate one or more of the visual indicators based on the output of the inclinometer, thereby indicating how the reticle is canted, if at all.

16 Claims, 11 Drawing Sheets

(56) References Cited

U.S. PATENT DOCUMENTS

| | | |
|---|---|---|
| 9,127,911 B2 | 9/2015 | Varshneya et al. |
| 9,157,701 B2 | 10/2015 | Varshneya et al. |
| 9,285,187 B2 * | 3/2016 | Stockdill .................. F41G 1/12 |
| 9,347,742 B2 | 5/2016 | Varshneya et al. |
| 9,677,848 B2 * | 6/2017 | Hamilton ................. F41G 1/38 |
| 9,677,851 B2 | 6/2017 | Hancosky |
| 9,777,992 B2 * | 10/2017 | McRee ..................... F41G 1/44 |
| 9,874,421 B2 * | 1/2018 | Stockdill .................. F41G 1/44 |
| 2004/0148841 A1 * | 8/2004 | Burzel ..................... F41G 1/44 |
| | | 42/123 |
| 2007/0056203 A1 * | 3/2007 | Gering ..................... F41G 1/34 |
| | | 42/130 |
| 2007/0137088 A1 * | 6/2007 | Peters ..................... F41G 1/473 |
| | | 42/111 |
| 2007/0197314 A1 * | 8/2007 | York ....................... A63B 57/00 |
| | | 473/407 |
| 2008/0104875 A1 | 5/2008 | Mayerle |
| 2014/0101982 A1 * | 4/2014 | McPhee ................... F41G 1/44 |
| | | 42/130 |
| 2014/0110482 A1 * | 4/2014 | Bay .......................... F41G 1/38 |
| | | 235/404 |
| 2014/0184476 A1 * | 7/2014 | McHale .................. G02B 27/017 |
| | | 345/8 |
| 2014/0370993 A1 * | 12/2014 | Roman .................... F41G 1/467 |
| | | 463/51 |
| 2015/0106046 A1 * | 4/2015 | Chen ...................... G01B 11/00 |
| | | 702/94 |
| 2015/0176948 A1 | 6/2015 | Varshneya et al. |
| 2015/0198410 A1 * | 7/2015 | McRee ..................... F41C 27/00 |
| | | 42/90 |
| 2016/0010949 A1 * | 1/2016 | Teetzel .................... F41G 1/35 |
| | | 42/115 |
| 2016/0223293 A1 * | 8/2016 | Maryfield ............... F41G 11/00 |
| 2016/0370147 A1 | 12/2016 | Hancosky |
| 2017/0082400 A1 | 3/2017 | York et al. |
| 2017/0138698 A1 | 5/2017 | York et al. |
| 2017/0254619 A1 | 9/2017 | Scott |

* cited by examiner

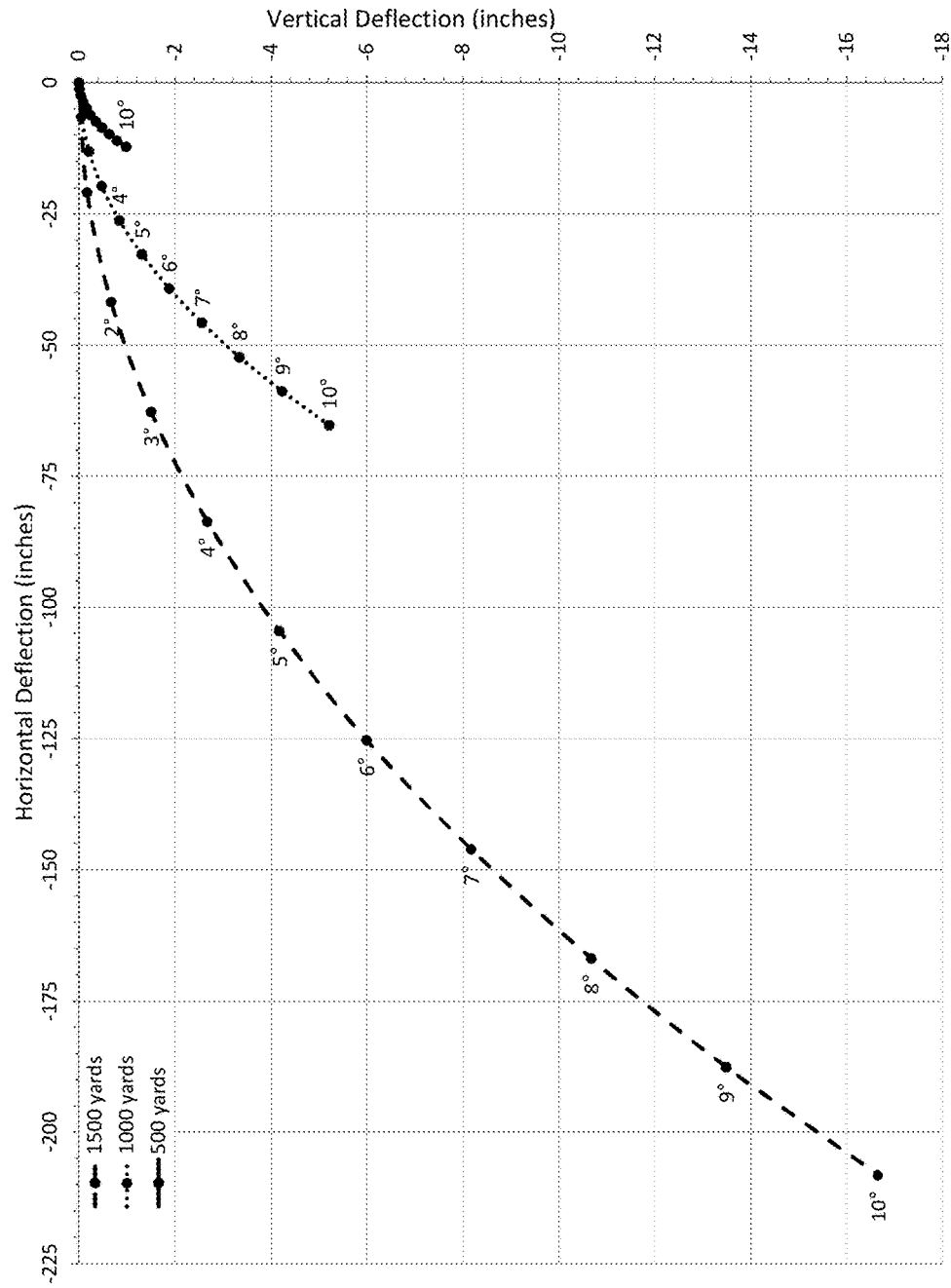

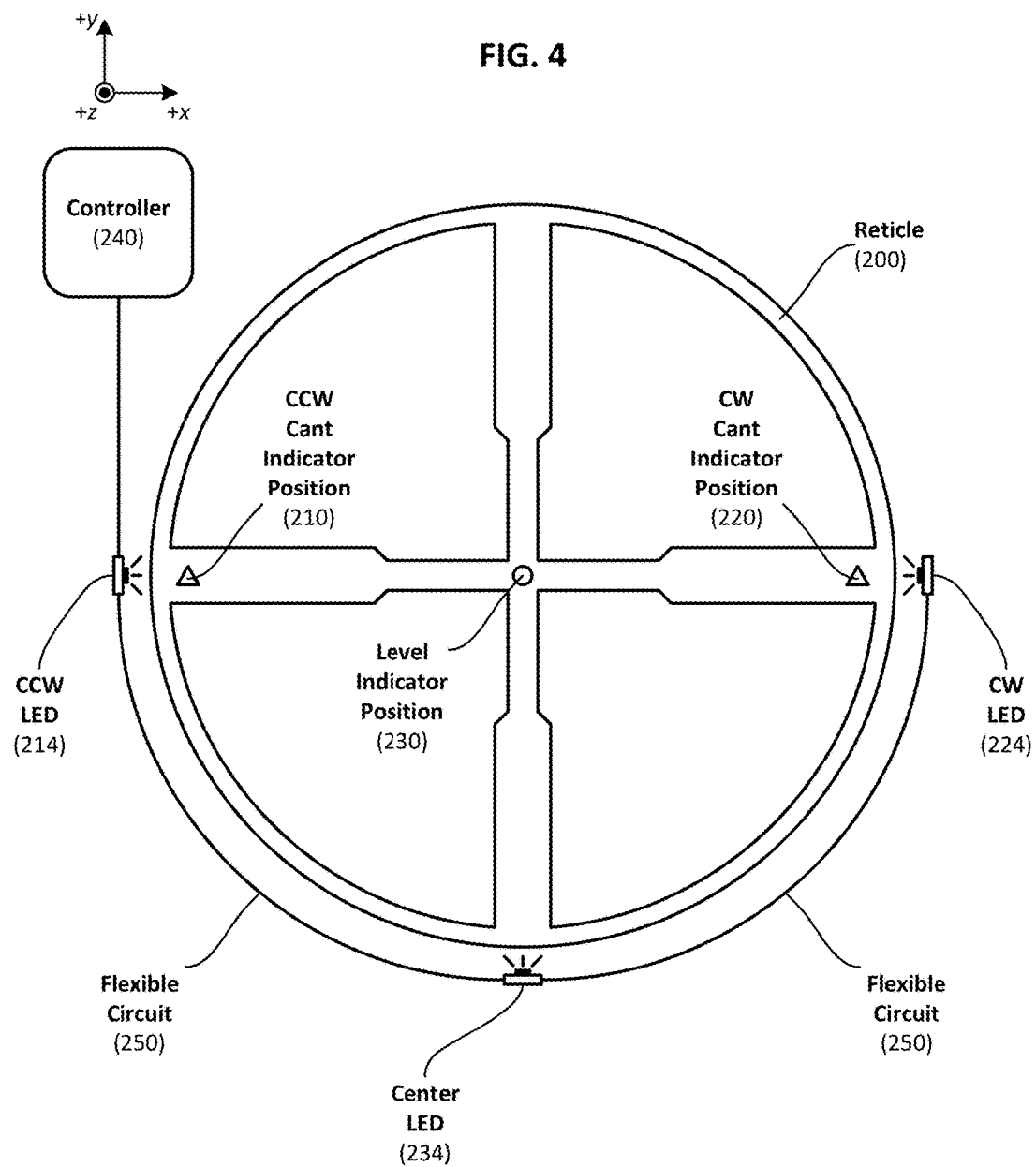

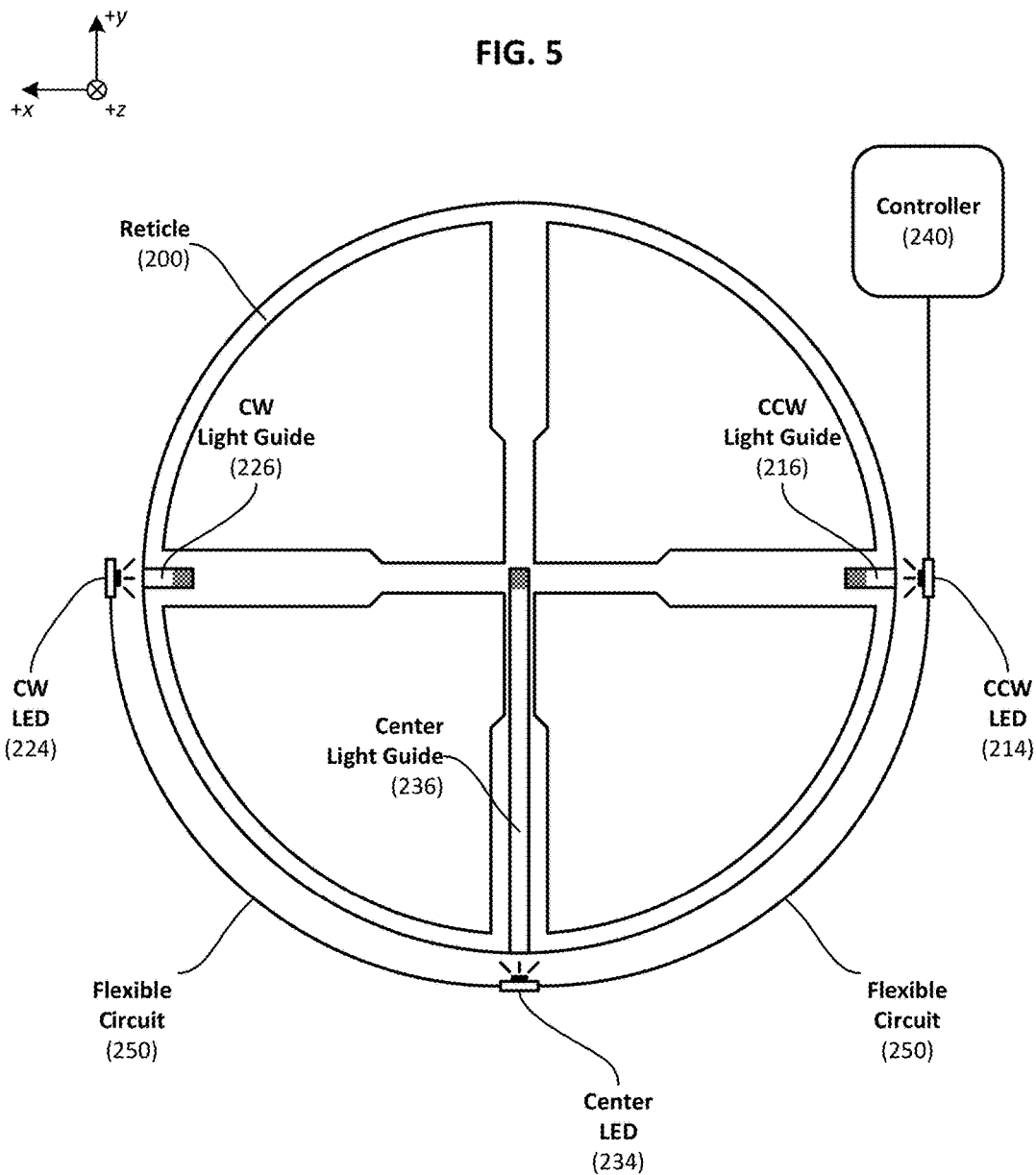

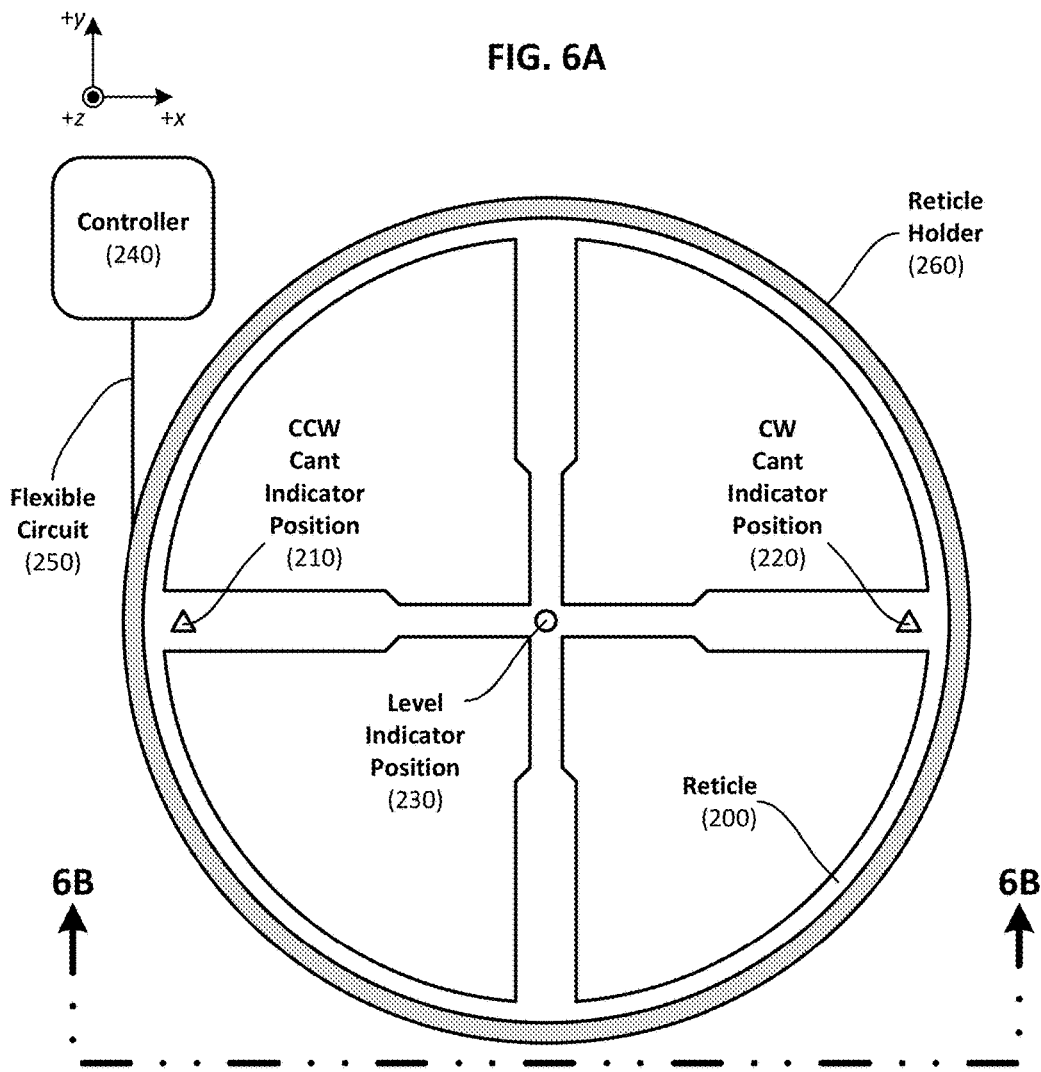
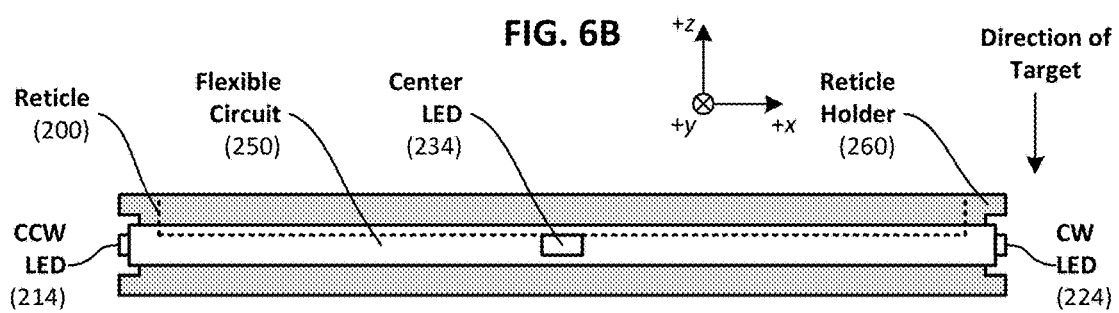

Reticle canted CCW.
CCW LED illuminated.
Center LED blinking.

Reticle canted CW.
CW LED illuminated.
Center LED blinking.

Reticle level.
Center LED steadily illuminated.

OPTICAL SYSTEM WITH CANT INDICATION

CROSS REFERENCE TO RELATED APPLICATIONS

This application claims benefit from U.S. Provisional Patent Application 62/197,187, filed Jul. 27, 2015 entitled OPTICAL SYSTEM WITH CANT INDICATION, the contents of which are hereby incorporated by reference.

FIELD OF THE INVENTION

This disclosure relates generally to gun sighting systems, and more specifically, to gun sighting systems that are capable of indicating whether the sighting system is canted off-center.

BACKGROUND

Accuracy and precision are of critical importance in a wide range of ballistics applications, examples of which include target shooting, hunting, self-defense, military, and law enforcement applications. Because the uncertainty associated with the unaided aiming of a firearm or other weapon is often significant, many improvements have been made to increase a shooter's ability to accurately hit an intended target. One such improvement is a telescopic sight, which is also sometimes referred to as a riflescope, or more simply, a scope, which are oftentimes mounted on long guns, but may also be used in conjunction with some handguns. A scope provides improved viewing of the target, for example using optical magnification, and therefore helps the shooter visualize where a projectile will go. In addition to providing magnification, a scope will also often include a reticle having stadia marks or other visual indicia that can be used to facilitate range-finding and to help the shooter adjust for the gravitational and aerodynamic (crosswind) forces that affect the trajectory of a projectile. For example, many reticles provide multiple aiming points for aiming at different distances or under different wind conditions.

Although a properly mounted and calibrated scope will help a shooter compensate for gravitational and aerodynamic forces, the way the firearm is held can still adversely affect the accuracy of the shot. In particular, side-to-side tilt of a scope mounted to a firearm, also referred to as "cant", is a potentially significant source of inaccuracy, and therefore even if a shooter makes appropriate adjustments for range and windage, his/her shot may still miss its intended target if the scope is canted even slightly off-center. FIGS. 1A and 1B illustrate cant. FIG. 1A illustrates a long gun having an optical system 10, such as a scope, mounted thereon. The optical system 10 has a long axis 12, which may also be referred to as the optical axis or the z axis. FIG. 1B illustrates the view directly along the z axis of the optical system 10, and illustrates two other axes. These axes include a horizontal transverse axis 14, and a vertical transverse axis 16. The transverse axes 14, 16 are both transverse to the z axis. Vertical deflection, or cant, of a system may be measured as deflection of the optical system from the vertical transverse axis 16. For example, an instantaneous axis 18 is not aligned with the vertical transverse axis 16. The mis-alignment between the instantaneous axis 18 and the vertical transverse axis 16 is caused by rotation about the z axis. This rotation amount, also referred to as cant or cant angle, is illustrated in FIG. 1B as the angle θ20.

Canting a firearm to a small or even imperceptible degree can result in significant error downrange, particularly as the distance to the target increases. In a typically mounted scope, the optical axis of the scope is approximately one or two inches above the bore of the firearm. In this case, when the firearm and the scope are canted off-center, the bore of the firearm moves in the opposite direction as the scope. The resulting error manifests as both a horizontal and vertical deflection from the intended target. This error is illustrated in FIG. 2, which is a graph indicating projectile deflection at various ranges as a function of firearm cant angle. The data illustrated in FIG. 2 were modeled based on the trajectory of a 30 caliber, 180 grain Nosler ballistic tip hunting bullet fired from a .300 Winchester Magnum cartridge. At 1500 yards, only 1° of firearm cant results in 20.92 inches (1.74 feet) of horizontal deflection. Canting the firearm 10° results in 12.24 inches (at 500 yards), 65.28 inches (at 1000 yards), or 208.17 inches (at 1500 yards) of horizontal deflection. Vertical deflection is lesser in magnitude than horizontal deflection, but is still significant enough to make an otherwise accurate shot miss its target.

The data illustrated in FIG. 2 demonstrates the importance of reducing or eliminating cant when sighting a target through a scope. In particular, it should be appreciated that even if the shooter's intended target is properly sighted in the scope, a slight—and possibly imperceptible—cant may result in an errant shot. Many shooters rely on an inner sense of balance to ensure that their firearm is not canted. However, this reliance presupposes that the shooter has a fully functional, unimpaired sense of balance that reliably translates into the ability to hold a firearm without any cant. This often turns out not to be the case, particularly for shooters who are exposed to disorienting influences such as loud sounds and strong forces associated with shooting a firearm; repeated focusing on distant targets as viewed through one eye; prolonged periods of standing; exposure to the elements; and traversing or standing upon uneven, canted, and/or sloped terrain.

A number of systems have been developed to supplement a shooter's sense of balance and detect a canted firearm. For example, bubble- and/or fluid-based levels have been adapted for mounting on a firearm, scope, or mounting ring. These systems have limited precision due to fluid viscosity, are subject to freezing in extreme cold, are difficult to see in low light conditions, and often require the shooter to divert his/her attention from the target to determine whether the firearm is canted. For example, mechanical bubble levels are often installed on the exterior body of the riflescope or on an upper portion of a scope ring mount, thus requiring the shooter to move his/her eye away from the sight to see the bubble level. U.S. Pat. No. 6,978,569 discloses various embodiments of a firearm tilt indicator that relies on a physical mechanism, such as a gravity pendulum or a rolling ball. Mechanical systems such as these also often have limited precision, and they tend to fall out of calibration or otherwise fail after repeatedly being subjected to recoil forces. These shortcomings represent substantial obstacles to the development of a robust and reliable cant detection system that does not distract the shooter's attention from the target, and that can be used in a wide range of tactical environments. Other systems that display scope cant are also known, such as gun scope having a full Heads Up Display (HUD), as described in US Patent publication 2014/0184476. Such HUDs act as an opaque screen on which targeting information may be displayed. Other versions may overlay HUD information around the periphery of an optical viewing area. HUDs are generally fragile, expensive, and suffer negatively from exposure to rain, cold and other wet conditions that are often encountered in a typical hunting environment.

Embodiments of the invention address these and other limitations of the prior art.

SUMMARY

One embodiment is directed to a direct, see-through optical system having a main optical axis extending from an ocular end to an objective end of the optical system. The main optical axis of the optical system is structured to be fixedly aligned with a long axis of a shooting device. The see-through optical system includes an electronic inclinometer structured to determine a cant of the shooting device relative to a vertical transverse axis of the main optical axis of the optical system, and also includes an electronic indicator structured to provide an indicator signal to a user related to the determined cant.

In one aspect of the invention, the electronic indicator is a light system including a first indicator for clockwise cant and a second indicator for counter-clockwise cant. The electronic indicator may include a third indicator for indicating a vertical alignment of the shooting device with the optical system. The optical system may be housed in a telescopic sighting device having a front focal plane and a rear focal plane, and the first or second indicator may be located proximate the front focal plane, the second plane, or an eyepiece of the telescopic sighting device. In some embodiments the first or second indicator is located on a field stop proximate the rear focal plane. In some embodiments the electronic indicators are located near an outside edge of a viewing area of the optical system. In some embodiments the first and second indicator may be located on opposite sides of the optical system.

In some embodiments the electronic indicator may include a plurality of individual indicators, and may be disposed in an arc located near an outside edge of the viewing area of the optical system.

In some embodiments the electronic indicator is structured to indicate a direction of cant and a relative amount of cant such as, for example, by indicating the amount of cant by a flashing rate or increasing light intensity of the electronic indicator.

In some embodiments the electronic indicator is structured to indicate a vertical alignment of the shooting device with the optical system by illuminating both the first and second indicator.

In some embodiments the electronic indicator may be a haptic indicator or an aural indicator.

In some embodiments the electronic inclinometer is an accelerometer.

Other embodiments include an optical sighting system having a main optical axis structured to align with a gun barrel when mounted to a gun, which includes a rotation detector structured to measure an amount of rotation of the gun barrel about its long axis, a plurality of electronic light indicators structured to provide one or more light signals to a user indicative of the measured amount and direction of rotation of the gun barrel, and an electronic controller coupled to the rotation detector and structured to cause the plurality of light indicators to generate the one or more light signals.

In some aspects the electronic controller may include an electronic inclinometer, such as an accelerometer, structured to measure an instantaneous amount of gun barrel rotation about is long axis.

In some embodiments the electronic controller is coupled to a user controllable switch, which may be used to control a light intensity of the one or more light signals.

Yet other embodiments are directed to a cant-detecting reticle assembly including a reticle having a horizontal axis that includes a target point, a first cant indicator position on a first side of the target point, and a second cant indicator position on a second side of the target point that is opposite the first side, a first light emitter optically coupled to the first cant indicator position, such that when the first light emitter is activated, the first cant indicator position is illuminated, a second light emitter optically coupled to the second cant indicator position, such that when the second light emitter is activated, the second cant indicator position is illuminated, an inclinometer configured to generate a first signal in response to detecting that the reticle is canted in a first direction, and a second signal in response to detecting that the reticle is canted in a second direction that is opposite the first direction, and a controller that is configured to activate the first light emitter in response to receiving the first signal from the inclinometer, and to activate the second light emitter in response to receiving the second signal form the inclinometer.

In some embodiments the first and second cant indicator positions are located at opposite ends of the horizontal axis.

In some embodiments the cant-detecting reticle assembly further includes a printed circuit board to which the inclinometer and the controller are mounted.

In some embodiments the cant-detecting reticle assembly further includes a flexible circuit, wherein the flexible circuit supports conductors extending from the controller to the first and second light emitters.

In some embodiments the cant-detecting reticle assembly further includes a ring-shaped reticle holder disposed in a first focal plane, wherein the reticle is mounted in an interior portion of the reticle holder, and the first and second light emitters are positioned on an exterior circumferential surface of the reticle holder. In other embodiments the first and second light emitters are positioned other than on the reticle or reticle holder.

In some embodiments the cant-detecting reticle assembly further includes a third light emitter optically coupled to the target point, such that when the third light emitter is activated, the target point is illuminated, and the controller is further configured to activate the third light emitter steadily when neither of the first and second signals are received from the inclinometer.

In other embodiments a third light emitter is optically coupled to the target point, such that when the third light emitter is activated, the target point is illuminated and the controller is further configured to activate the third light emitter intermittently when either of the first and second signals are received from the inclinometer.

BRIEF DESCRIPTION OF THE DRAWINGS

FIG. 2 is a graph indicating projectile deflection at various ranges as a function of firearm cant angle.

FIG. 4 schematically illustrates the frontward appearance of an example reticle that is capable of indicating whether an optical system is canted off-center.

FIG. 5 schematically illustrates the rearward appearance of an example reticle that is capable of indicating whether an optical system is canted off-center.

FIG. 6A schematically illustrates the frontward appearance of an example reticle that is capable of indicating whether an optical system is canted off-center, wherein the reticle is mounted in a ring-shaped reticle holder.

FIG. 6B schematically illustrates the reticle and reticle holder assembly of FIG. 6A, as viewed along line 6B-6B.

DETAILED DESCRIPTION

The various embodiments of an optical system having cant detection and indication disclosed herein are, compared to previous devices, less susceptible to error caused by exposure to adverse environmental conditions and/or recoil forces. They also tend to reduce or eliminate the need for the shooter to divert his/her attention from a sighted target to check a cant indicator, and the illuminated indicators work well in low light conditions. They are more rugged and less fragile than HUD systems. They can also be retrofitted to existing scopes. These and other advantages will be apparent from the following disclosure.

The various embodiments disclosed herein are described in conjunction with a projectile aiming system that is configured for use with a rifle and that is embodied in the type of telescopic sight typically referred to as a riflescope. However, such embodiments may also be implemented with projectile aiming systems other than riflescopes, including systems such as reflex sights, bow sights, pistol sights and digital sights. Such systems may be used on weapons other than rifles, including devices which are capable of propelling projectiles along substantially pre-determinable initial trajectories. Examples of such devices include handguns, pistols, shotguns, bows, crossbows, artillery, trebuchets, and the like.

Furthermore, while several of the embodiments disclosed herein are described in conjunction with a shooter attempting to hit an intended target, it will be appreciated that such embodiments can also be used to accurately mount a riflescope to a firearm. For example, in one implementation a firearm is fixed in a level position, for example using a vice or other temporary fixed holder. The firearm includes mounting rings that are used to support a riflescope. The riflescope is placed in the mounting rings. The user sights through the riflescope and ensures that the scope is not canted before tightening the mounting rings and fixing the relatively alignment of riflescope and firearm. Such a technique is significantly more likely to result in a substantially aligned system as compared to a manual alignment, particularly since an imperceptible degree cant may result in significant error downrange.

Figure 1A:
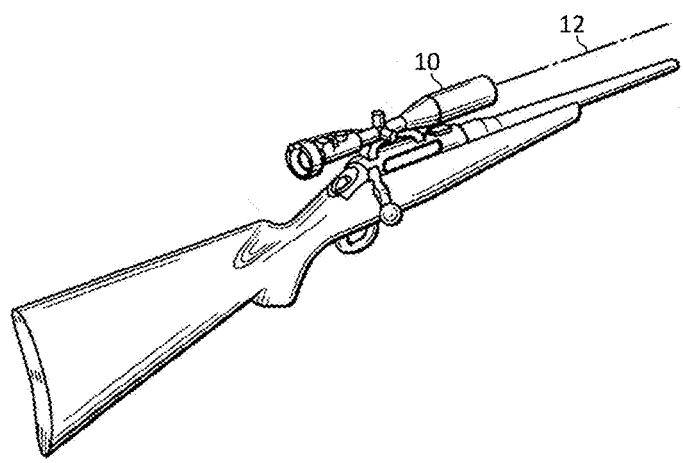
FIG. 1A is a perspective view of an example riflescope illustrating a long axis.
Figure 1B:
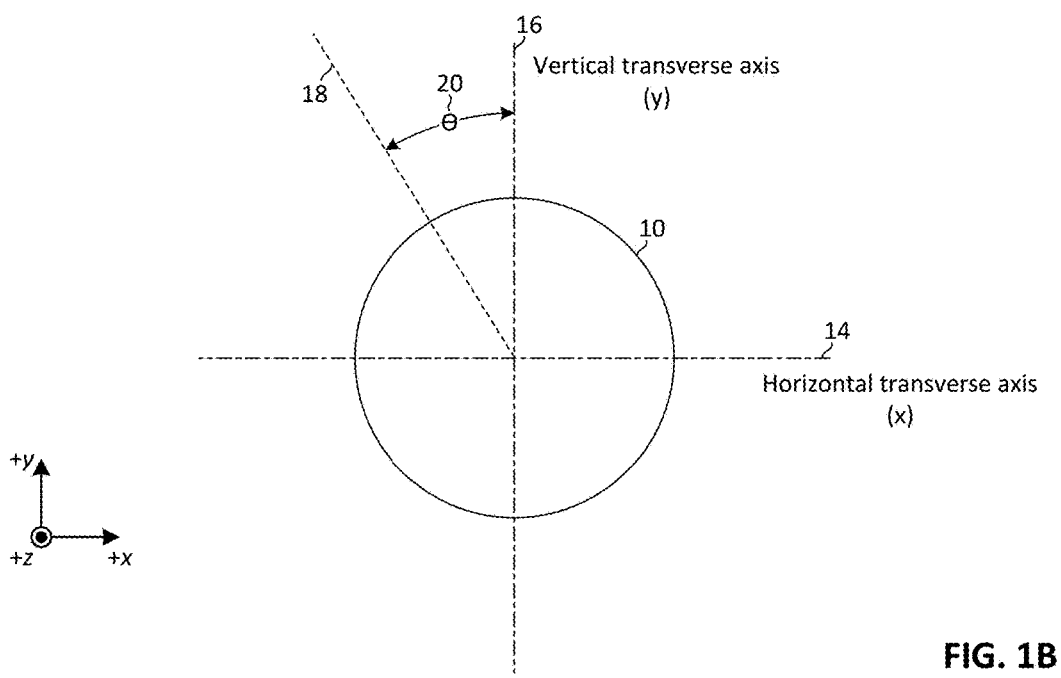
FIG. 1B is a graph illustrating orientation of various axes relative to the long axis illustrated in FIG. 1A.
Figure 3:
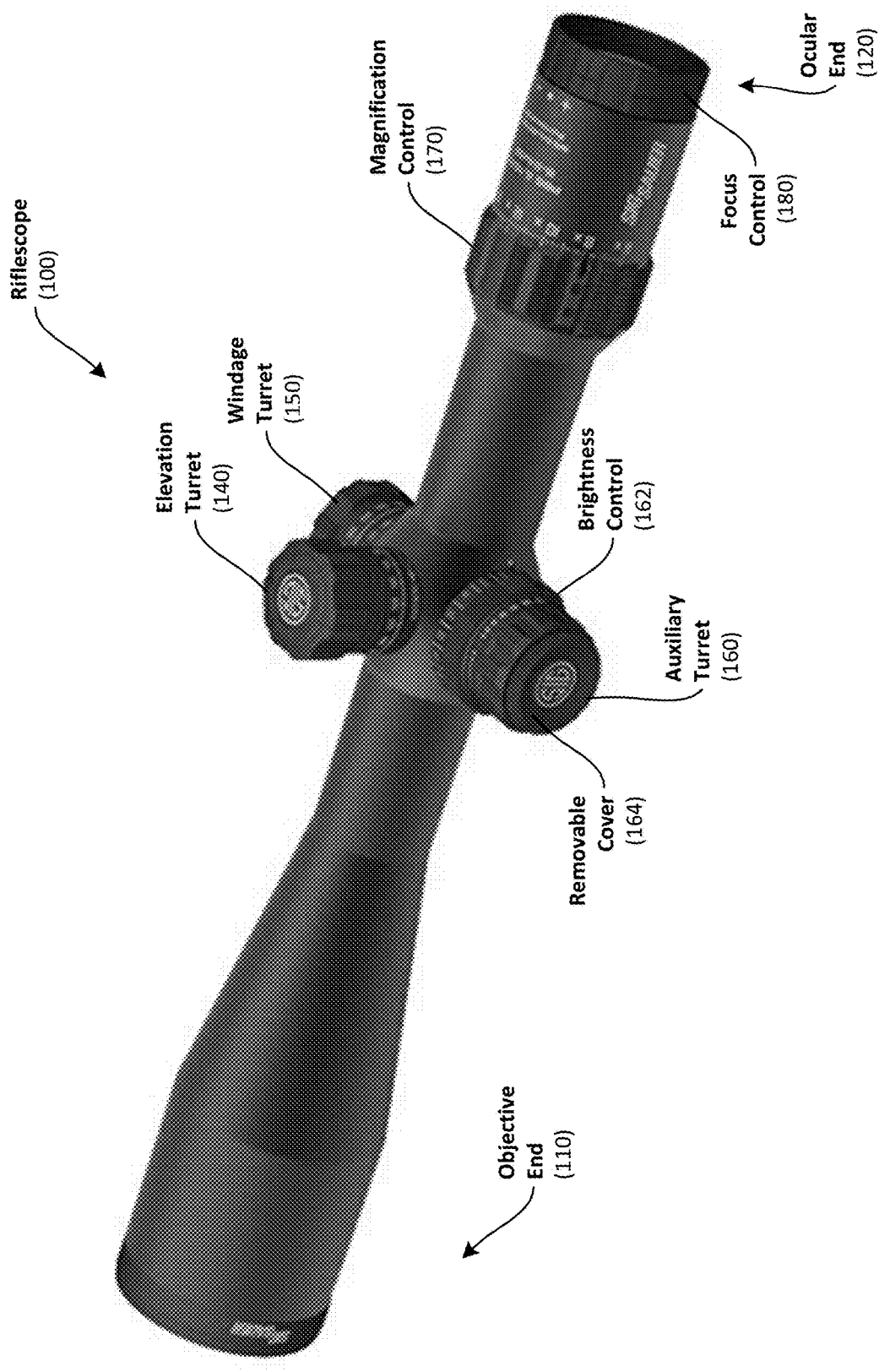
FIG. 3 is a perspective view of an example riflescope that may be used with a reticle that is capable of indicating whether the riflescope is canted off-center.

FIG. 3 is a perspective view of a riflescope 100 that may be used with an indicator system that is capable of indicating whether riflescope 100 is canted off-center. The indicator is positioned within riflescope 100, along its optical axis, and therefore is generally not visible in the exterior perspective view illustrated in FIG. 3, but in other embodiments the indicator may be visible to the exterior of the riflescope. An objective end 110 of riflescope 100 is positioned toward the intended target, while an ocular end 120 is positioned adjacent to the shooter's eye. Riflescope 100 includes an elevation turret 140 which can be used to adjust the vertical calibration of the reticle, and a windage turret 150 which can be used to adjust the horizontal calibration of the reticle. An auxiliary turret 160 can be used to provide other adjustments or manipulations to riflescope 100, such as a parallax compensation adjustment or, for implementations that include an illuminated reticle, an illumination brightness control 162. The reticle is preferably aligned with the riflescope turrets, for example to within ±3° or ±1°. While auxiliary turret 160 is positioned on the side of the riflescope body in the illustrated embodiment, in other embodiments it may be placed on the top of the riflescope body adjacent to ocular end 120.

In the illustrated embodiment, riflescope 100 includes electronics that rely on a power source, and therefore includes a battery that is accessible via a removable cover 164 that forms part of auxiliary turret 160. In one embodiment removable cover 164 is threaded onto the body of auxiliary turret 160, while in other embodiments a snap-fit configuration is used. In still other embodiments auxiliary turret 160 is omitted altogether and its associated functionality, such as reticle illumination control, is optionally incorporated into one or more of the other turrets. Riflescope 100 also optionally includes a magnification control 170 and/or a focus control 180. While many implementations are described in the context of riflescope 100, other embodiments can be implemented in conjunction with a wide range of different telescopic sighting systems, and thus it will be appreciated that the particular combination and arrangement of features illustrated in FIG. 3 may be modified in other embodiments.

In some embodiments the cant indicator may be integrated into or on a reticle. A reticle is an object or image that is viewable through the eyepiece of an optical sighting device. Example reticles include strands of hair, spider web silk, synthetic fibers, wires, electroformed metallic elements, or any other sufficiently thin and strong material. A reticle helps the shooter aim the fire arm toward a target. While a virtually unlimited range of different reticle shapes and configurations exist, perhaps the simplest reticle design is a crosshair formed by perpendicularly intersecting lines in the same of a plus symbol (+). Other common reticle configurations include dots, posts, circles, scales, or any combination of the foregoing, with the particular configuration being selected based on the intended use of the device that incorporates the reticle. When used in conjunction with projectile aiming systems, reticles often include stadia marks that facilitate range-finding. For example, a reticle that includes stadia marks can be used to estimate the range to objects of known size and the size of objects at known range, thus helping a shooter more accurately compensate for factors such as gravitational effects (also referred to as "bullet drop compensation") and windage. In some applications reticles are configured with stadia markings that includes ballistic hold-over points that are matched for long-range precision shooting.

FIG. 4 schematically illustrates the frontward appearance of an example reticle 200 that is capable of indicating whether an optical system is canted off-center. As used herein, the term "frontward appearance" refers, in addition to its ordinary meaning, to the appearance of reticle 200 when viewed under normal usage conditions, that is, from ocular end 120 of riflescope 100. From this perspective, the intended target would appear behind reticle 200, that is, in the −z direction as illustrated in FIG. 4. Reticle 200 includes horizontal and vertical stadia lines that meet at a target point. Depending on the demands of a particular implementation, the stadia lines may or may not be of constant width, and may or may not extend across the entire field of view. The example embodiment illustrated in FIG. 4, for instance, includes stadia lines which are wider near the reticle periphery, and which are narrower near the target point. In such embodiments, reticle 200 is formed using a flattened wire or an electroformed metallic element, although other materials can be used in other embodiments.

The horizontal stadia line of reticle 200 includes a CCW cant indicator position 210 and a CW cant indicator position 220 which are located on opposite sides of the center target point. A level indicator position 230 is optionally located at the target point. In the illustrated embodiment, the cant indicators are in the shape of an upward pointing triangle and the level indicator is in the shape of a circle. However, different shapes can be used for these indicators in other embodiments. The indicators provide a path for light to pass through reticle 200 at the respective indicator positions, thus giving the indicator an illuminated appearance, as will be described in turn. In particular, light generated by a CCW LED 214 is visible at CCW cant indicator position 210, light generated by a CW LED 224 is visible at CW cant indicator position 220, and light generated by a center LED 234 is visible at level indicator position 230. These LEDs are positioned around the periphery of reticle 200, and are connected to a controller 240 via a flexible circuit 250.

A wide range of alternative configurations may be implemented. For example, while FIG. 4 illustrates the CCW and CW cant indicator positions as being located on opposite sides of the target point, in other embodiments the cant indicator positions may be positioned elsewhere in the field of view, including both on one side of the target point. In some cases one or more of the cant indicator positions may be located above or below the horizontal stadia line. While LEDs are used as a light sources in the illustrated embodiment, other light sources can be used in other embodiments. While position 230 is referred to as a level indicator position, it will be appreciated that in embodiments wherein such position is continuously illuminated regardless of whether or not the system is canted, such position may also be referred to as a target indicator, an aiming point indicator, or another similar term.

FIG. 5 schematically illustrates the rearward appearance of reticle 200. As used herein, the term "rearward appearance" refers, in addition to its ordinary meaning, to the appearance of reticle 200 when viewed from the opposite (+z) direction as in FIG. 3, and therefore the rearward appearance would not be visible under normal use of riflescope 100. As can be seen from this perspective, reticle 200 includes a CCW light guide 216 positioned to propagate light emitted from CCW LED 214 through CCW cant indicator position 210 such that the light is visible from ocular end 120 of riflescope 100. Reticle 200 also includes a CW light guide 226 positioned to propagate light emitted from CW LED 224 through CW cant indicator position 220 such that the light is visible from ocular end 120 of riflescope 100. Likewise, reticle 200 includes a center light guide 236 positioned to propagate light emitted from center LED 234 such that the light is visible from ocular end 120 of riflescope 100. Center light guide 236 is longer than the other light guides because it extends to the target point at the center of reticle 200.

The light guides illustrated in FIG. 5 may include any suitable material capable of propagating visible light, examples of which include fiber optic cables, as well as plastic, polymeric, or glass waveguides. For example, in one embodiment an optical fiber has one end cut at a 45° angle to the optical axis of the fiber, thus forming a reflective surface that causes the light emitted by the peripheral LEDs to be redirected along the optical axis toward ocular end 120 of riflescope 100 (+z direction). This allows the user to look directly at the light emitter through the optical fiber. In such embodiments the light emitted by the peripheral LEDs is not reflected off electroformed reticle material. In such embodiments the optical fiber can be mounted to the front or rear of reticle 200. Mounting the optical fiber to the front of reticle 200 tends to be easier to manufacture, but may introduce parallax since the fiber is on a different focal plane than the actual electroformed reticle. Alternatively, mounting the optical fiber to the rear of reticle 200 and aligning the reflective surface with a small aperture in the electroformed reticle allows the reticle and the light source to be substantially coplanar, thus reducing eliminating parallax.

In an alternative embodiment a light-propagating channel is etched into reticle 200. In another alternative embodiment the light guides are omitted altogether, and light emitted from the peripheral LEDs illuminates reflective electroformed reticle materials deposited at the indicator positions illustrated in FIG. 4. Additional details with respect to how light is coupled and propagated amongst the various components illustrated in FIG. 5 will be described in turn. Because the light guides are formed on and/or positioned behind the reticle stadia wires, they are generally not visible to a user not looking through riflescope 100. FIG. 5 also illustrates that the aforementioned LEDs are positioned around the periphery of reticle 200, and are connected to controller 240 via flexible circuit 250.

FIG. 6A schematically illustrates the frontward appearance of reticle 200 having been mounted in a ring-shaped reticle holder 260. Reticle holder 260 is used to secure and mount reticle 200 within the body of riflescope 100, and thus these components are configured to fit securely together for example using a snap fit and/or an epoxy. Reticle holder 260 is also used to secure flexible circuit 250 and the LEDs mounted thereto. This is made clear with reference to FIG. 6B, which schematically illustrates the assembly of FIG. 6A, as viewed along line 6B-6B, that is, in the xz plane. In particular, FIG. 6B illustrates reticle 200 positioned within reticle holder 260. Flexible circuit 250 is positioned around an exterior circumferential surface of reticle holder 260. The light sources CCW LED 214, CW LED 224, and center LED 234 are mounted to flexible circuit 250 at appropriate locations around the circumference of reticle holder 260. In particular, FIG. 6B illustrates that center LED 234 is positioned at the bottom-center of reticle holder 260, while CCW LED 214 and CW LED 224 are positioned at the left and right sides, respectively, of reticle holder 260.

Figure 7:
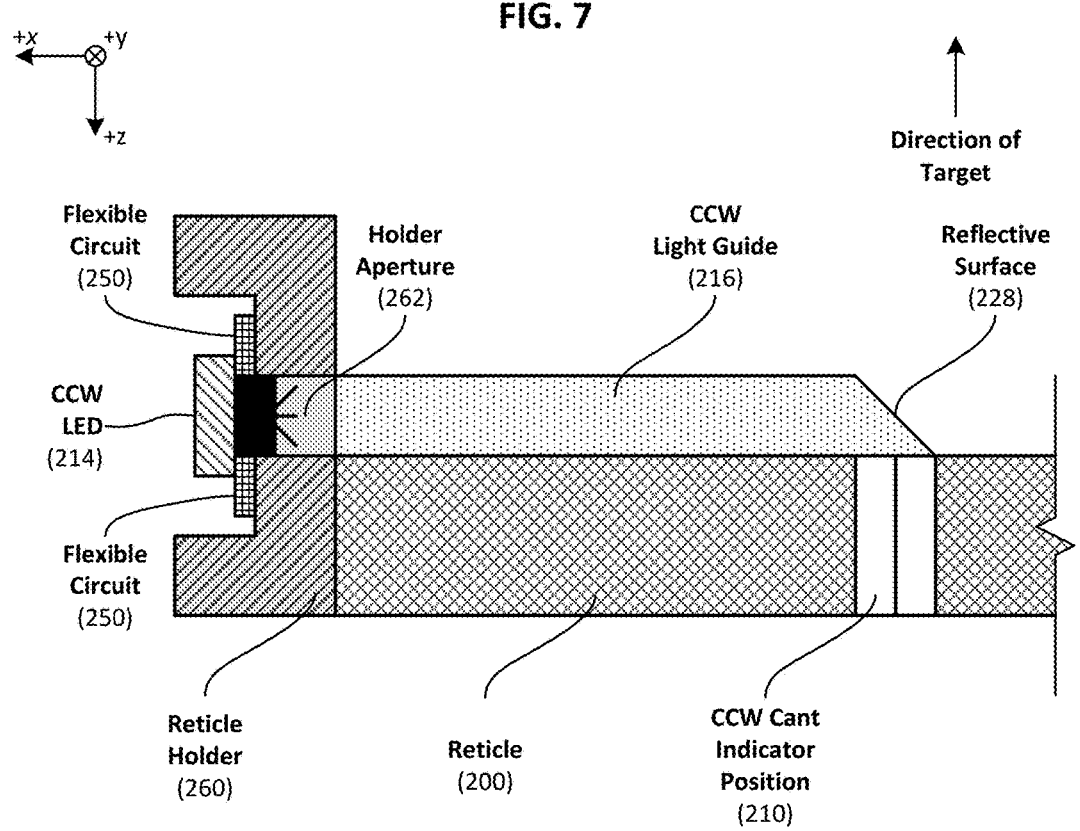
FIG. 7 schematically illustrates a cross-sectional view of an example technique for coupling light from a peripherally-positioned light emitter to an aperture formed in a reticle.

FIG. 7 schematically illustrates a cross-sectional view of an example technique for coupling light from a peripherally-positioned light emitter to an aperture formed in reticle 200. More specifically, FIG. 7 illustrates reticle 200 mounted in reticle holder 260. Reticle 200 includes CCW cant indicator position 210, which can be seen as forming an aperture in reticle 200, thereby allowing the reticle and the light source to be positioned in the same focal plane, thus reducing or eliminating parallax. Flexible circuit 250 is positioned on an exterior circumferential surface of reticle holder 260, and supports CCW LED 214, which is mounted thereto. Reticle holder 260 further includes a holder aperture 262 configured to allow light emitted by CCW LED 214 to pass through reticle holder 260 and enter CCW light guide 216. In certain embodiments holder aperture 262 is filled with a light transmitting material, for example the same material that comprises CCW light guide 216, while in other embodiments, such as that illustrated in FIG. 7, holder aperture 262 is empty space. CCW light guide 216 includes a reflective surface 228 that is angled so as to reflect light that is emitted from CCW LED 214, and that is transmitted via CCW light guide 216, through CCW cant indicator position 210. Such light is then visible to a user looking through riflescope 100 in the direction of the intended target (the −z direction). In one embodiment, reflective surface 228 includes reflective electroformed reticle material. While FIG. 7 illustrates the transmission of light from CCW LED 214 through CCW cant indicator position 210, it will be appreciated that a similar configuration can be used to transmit light (a) from CW LED 224 through CW cant indicator position 220, and (b) from center LED 234 through level indicator position 230.

The example embodiment illustrated in FIGS. 6A, 6B, and 7 illustrate CCW cant indicator position 210 and CW cant indicator position 220 being positioned on a horizontal stadia line of reticle 200, horizontally offset from reticle holder 260. In alternative embodiments, however, cant indicator positions 210, 220 are not positioned on the reticle itself, but rather on another element that forms part of the optical system. For example, in one alternative embodiment wherein a glass reticle is mounted in a black or other dark-colored field stop that functions as reticle holder 260, CCW cant indicator position 210 and CW cant indicator position 220 may be formed in the field stop itself, as opposed to being positioned on a stadia line of reticle 200. This alternative embodiment reduces the degree to which reticle 200 is manipulated by coupling thereto components such as light guides 216, 226, or forming cant indicator positions 210, 220 therein. Such an embodiment may be particularly useful in conjunction with a front focal plane (FFP) optical system wherein the aiming reticle is positioned on the first focal plane. This is because a FFP optical system allows the reticle image to magnify as the objective image is magnified. As the reticle image is magnified, the perimeter features of the reticle, such as indicator positions 210, 220 are no longer visible. In FFP optical systems, it may therefore be preferred to locate indicator positions 210, 220 in reticle holder 260, field stop, eyepiece, or in another location that would remain visible and stationary, appearing as a circumferential border or frame to the magnified reticle 200, regardless of the applied magnification. In any embodiment, the indicator may be positioned anywhere that the user may view the indicator while looking through the scope, be it at or near the front focal plane, at or near the rear focal plane, in or near an eyepiece, or anywhere where the indicator may be used by the shooter.

Figure 8:
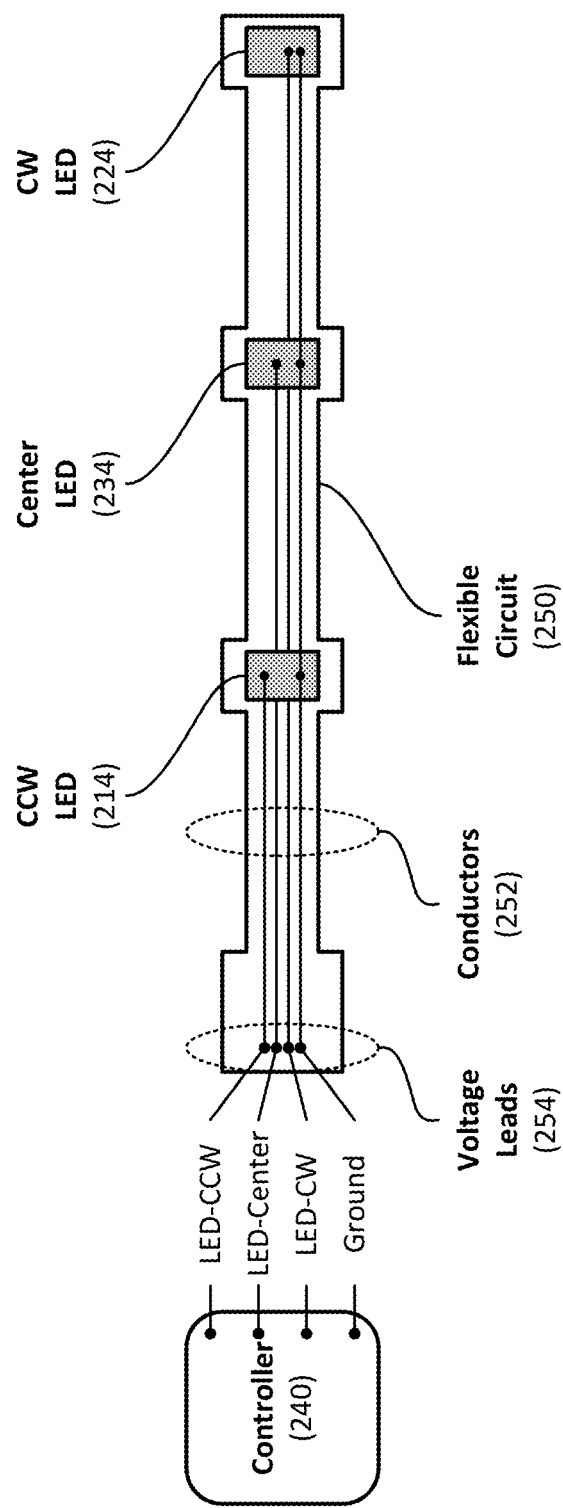
FIG. 8 schematically illustrates the configuration of an example flexible circuit that can be used in conjunction with the reticle illustrated in FIG. 4.

FIG. 8 schematically illustrates an example configuration of flexible circuit 250. As described herein, in certain embodiments flexible circuit 250 is positioned along an exterior circumferential surface of reticle holder 260. In alternative embodiments, flexible circuit 250 can be integrated into, or otherwise positioned in an interior portion of reticle holder 260. In still other embodiments, flexible circuit 250 is coupled directly to reticle 200. Light emitters CCW LED 214, CW LED 224, and center LED 234 are mounted to flexible circuit 250, for example using soldered connections. A plurality of conductors 252 extend from controller 240 to the light emitters. Conductors 252 include a ground conductor and an individual voltage lead dedicated to each emitter, thereby allowing each emitter to be controlled independently of the others. Conductors 252 are coupled to controller 240 via a plurality of voltage leads 254.

Figure 9:
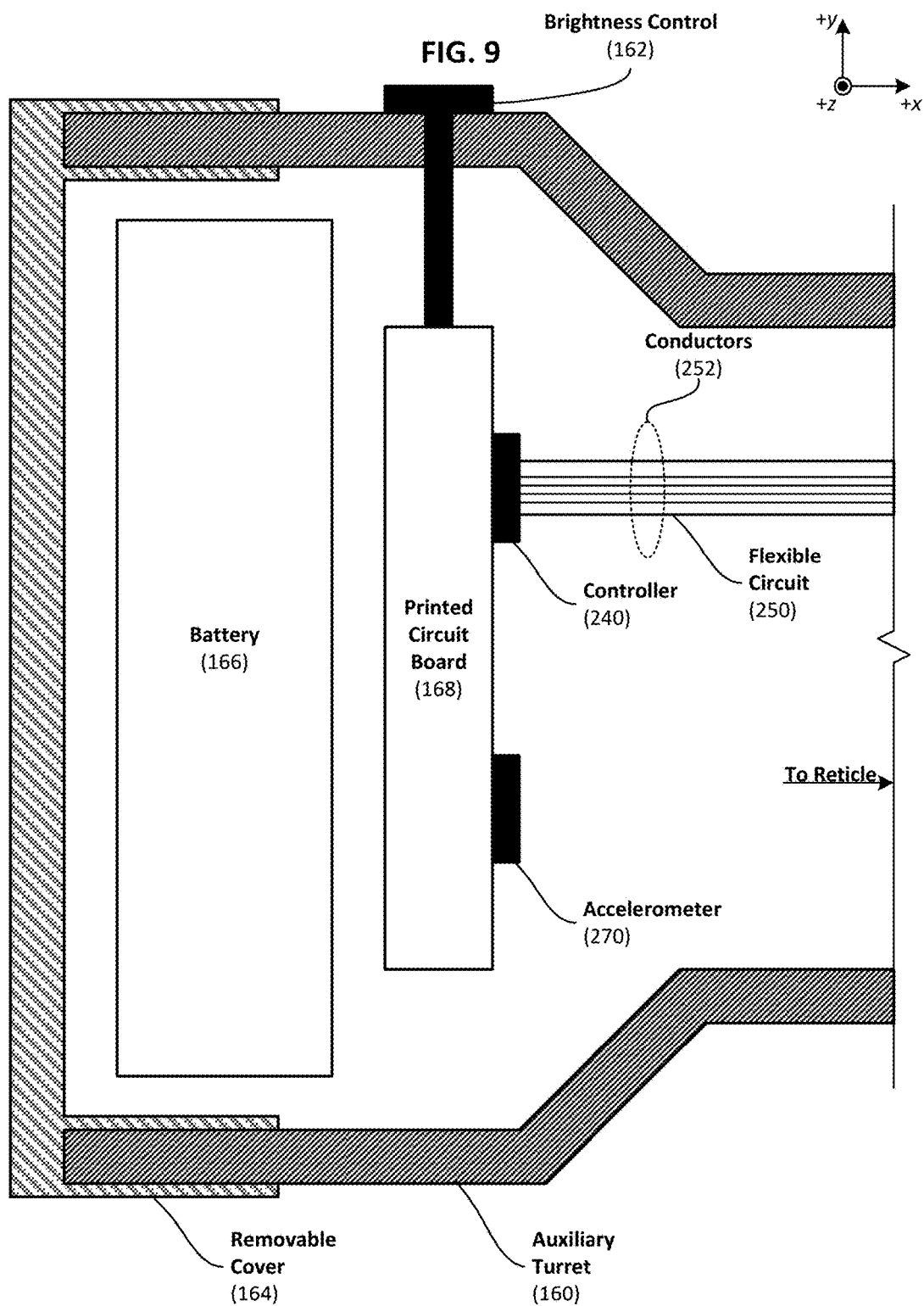
FIG. 9 schematically illustrates selected components included within an auxiliary turret of the riflescope illustrated in FIG. 3, the selected components supporting the operation of a reticle that is capable of indicating whether the riflescope is canted off-center.

FIG. 9 schematically illustrates selected components included within auxiliary turret 160 of riflescope 100, the selected components supporting or otherwise controlling the operation of reticle 200. For example, auxiliary turret 160 houses a battery 166 that is accessible via removable cover 164, and that functions as a power source for the aforementioned light sources. In one embodiment battery 166 comprises a three-volt coil cell lithium battery, although any of a wide variety of suitable power sources can be used in other embodiments. In the illustrated embodiment auxiliary turret 160 also houses a printed circuit board 168 on which electronics that enable and control operation of reticle 200 are mounted. Such electronics include controller 240 and an inclinometer 270. Mounting these components on printed circuit board 168 enables both to share the common power supply provided by battery 166.

Controller 240 is electronically connected to the aforementioned light emitting elements (for example, CCW LED 214, CW LED 224, and center LED 234) via conductors 252 which are mounted on flexible circuit 250. Firmware in controller 240 is capable of individually illuminating the various light emitters in response to signals received from inclinometer 270. In one implementation controller 240 is a Model STM8L151C2U6 ultra-low-power microcontroller manufactured by STMicroelectronics (Geneva, Switzerland). Brightness control 162 is coupled to controller 240 via printed circuit board 168, thereby further allowing the user to manipulate the operation of reticle 200. In one embodiment brightness control 162 comprises a rotatable switch that is coupled to a potentiometer on printed circuit board 168. Other configurations can be implemented in other embodiments. It will be appreciated that certain of the components illustrated in FIG. 9 may be electronically connected to each other with appropriate connectors and/or conductors which are not illustrated for clarity.

Figure 10:
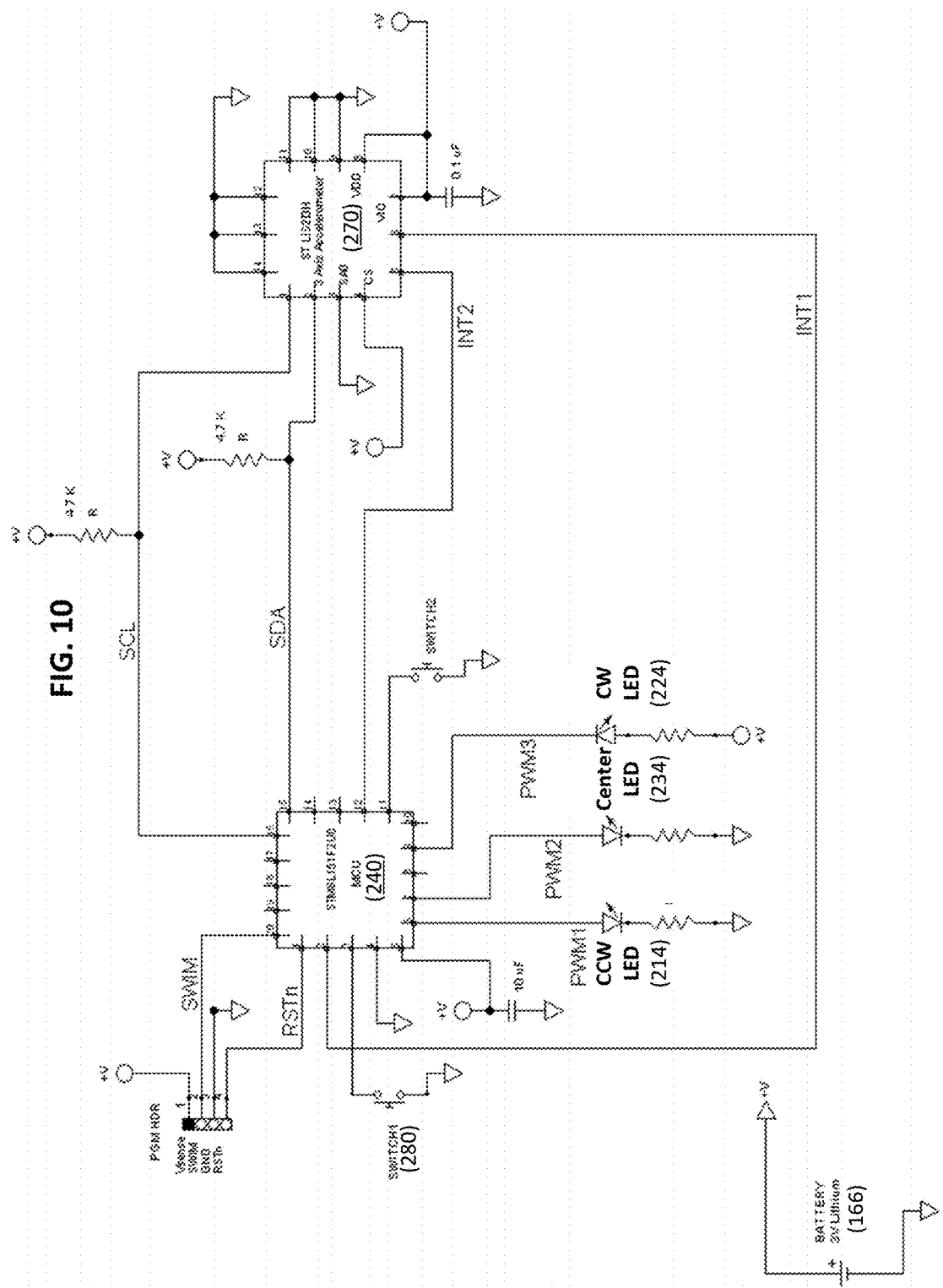
FIG. 10 is a circuit diagram illustrating selected electronic components that can be used to control the operation of an example reticle that is capable of indicating whether an optical system is canted off-center.

FIG. 10 is a circuit diagram illustrating one particular implementation of selected electronic components that can be used to control the cant indicator. Certain of these components (such as controller 240 and inclinometer 270) may be mounted on printed circuit board 168 itself, while other components (such as battery 166, CCW LED 214, CW LED 224, and center LED 234) may be electronically coupled to printed circuit board 168 or other components mounted thereto. For instance, the example embodiment illustrated in FIG. 10 includes a switch 280 that can be used to disable the device when not in use, thereby preserving battery life. In such embodiments switch 280 is optionally coupled to a mechanical switch positioned on the exterior of riflescope 100, for example on auxiliary turret 160.

Inclinometer 270, which may be embodied by an accelerometer, is a solid-state electronic device configured to determine whether riflescope is canted off-center. The accelerometer may be a 1-axis, 2-axis, or 3-axis accelerometer, for example. In other embodiments the inclinometer 270 may be any device capable of detecting and/or measuring cant. In the example embodiment illustrated in FIG. 9, inclinometer 270 is vertically oriented (in the yz plane), although it may be calibrated for use in other orientations as well. Thus, in certain embodiments inclinometer 270 is calibrated and aligned with reticle 200 during manufacture of riflescope 100 to detect rotation around the z-axis, which is the optical axis of riflescope 100. In other embodiments the cant indicator is separate from the reticle 200, but still aligned with the optical axis of the riflescope 100. Calibration may additionally or alternatively be performed when riflescope 100 is mounted to a firearm. In one implementation inclinometer 270 is a Model LIS2DH12 ultra-low-power, high-performance, three-axis inclinometer manufactured by STMicroelectronics (Geneva, Switzerland). Any of a variety of other suitable inclinometers can be used in alternative embodiments. The output signals generated by inclinometer 270 are provided to controller 240 via circuitry mounted on printed circuit board 168.

Figure 11A:
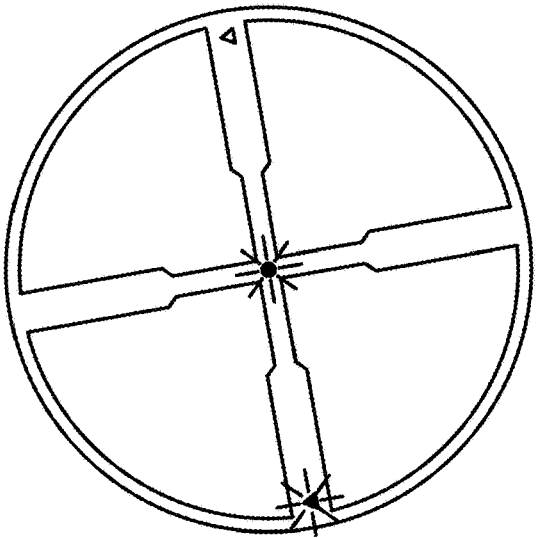
FIG. 11A illustrates the appearance of the reticle illustrated in FIG. 4 when the reticle is viewed through an optical sighting device that is canted counterclockwise (CCW).
Figure 11B:
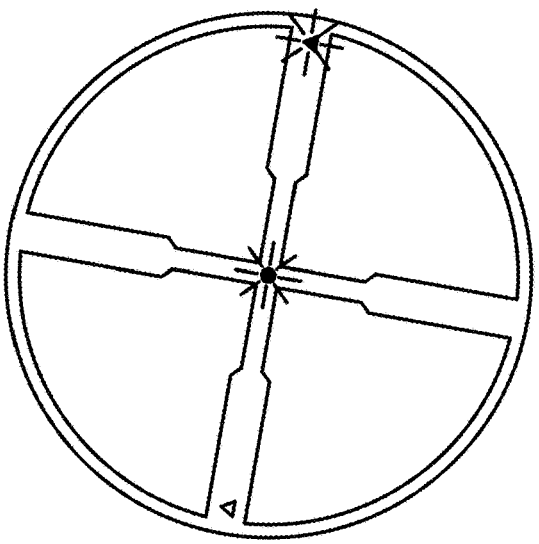
FIG. 11B illustrates the appearance of the reticle illustrated in FIG. 4 when the reticle is viewed through an optical sighting device that is canted clockwise (CW).
Figure 11C:
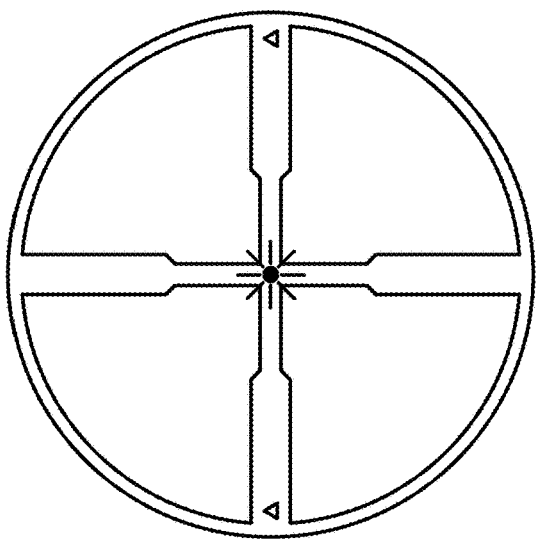
FIG. 11C illustrates the appearance of the reticle illustrated in FIG. 4 when the reticle is viewed through an optical sighting device that is not canted.

For example, if inclinometer 270 detects that riflescope 100 is canted CCW around the optical axis (the z-axis), controller 240 can be configured to illuminate CCW LED 214 steadily. Alternatively, if inclinometer 270 detects that riflescope 100 is canted CW around the optical axis (z-axis), controller 240 can be configured to illuminate CW LED 224 steadily. In either case, controller 240 can also be configured to illuminate center LED 234 intermittently, such as in a blinking fashion. These reticle configurations, which are illustrated in FIG. 11A (CCW cant) and FIG. 11B (CW cant), provides the shooter with a quick indication that riflescope 100 is not level, even without requiring the shooter to divert his/her attention from the center target point of the reticle. In particular, even without perceiving either of the illuminated cant indicator positions at the periphery of reticle, blinking level indicator position 230 at the center target point conveys to the shooter that the riflescope is canted. The steady illumination of one of the cant indicator positions conveys to the shooter how to adjust his/her hold on the firearm (for example, by rotation) to obtain a level shot. Likewise, if the shooter sees that level indicator position 230 is steadily illuminated, he/she will understand that the riflescope is not canted, again without diverting attention from the central target point. This reticle configuration is illustrated in FIG. 11C. This design avoids distracting the shooter with many lights or other potential distractions when he/she is ready to discharge the firearm.

In alternative embodiments reticle 200 can be configured to indicate the presence of cant using other combinations of illuminated cant indicators. For example, in an embodiment wherein the optional central level indicator position 230 is omitted, CCW LED 214 or CW LED 224 can be configured to illuminate, optionally intermittently (in a blinking fashion), depending on how the riflescope 100 is canted, if at all. In such embodiments the rate at which an illuminated cant indicator blinks is optionally proportional to the degree of cant, for example such that more extreme cant angles result in more rapid blinking of the indicator. As the reticle is rotated to achieve a level position the blinking slows, with the cant indicators eventually turning off completely when riflescope 100 is not canted. The absence of any illuminated cant indicators within the riflescope 100 indicates that the riflescope is held level. The use of variably-blinking cant indicators can also be used in another alternative embodiment wherein the central target point is always illuminated, which may be useful when implemented in conjunction with an illuminated reticle. In general, the use of variable-blinking cant indicators with a steadily illuminated (or altogether omitted) target point may be particularly useful in conjunction with riflescopes which are occasionally used at short ranges where a slight cant is less critical and the blinking target point could be distracting. Other combinations of illuminated cant indicators, and optionally a central target point indicator, can be used in other embodiments.

Although the above discussion described in detail how the cant indicators may be integrated into or associated with the reticle 200 of the riflescope 100, embodiments of the invention are not limited to always being mounted on or adjacent to the reticle 200. A riflescope 100 may be generally described as a direct-view, see-through, or optical scope. Such scopes are made from a transparent material, most commonly glass or plastic, and allow a direct viewing of a target when a user looks through the ocular end 120 of the riflescope 100. Each riflescope 100 includes a front focal plane and a rear focal plane, which are both in focus to the user's eyes when the riflescope is properly focused. Operation of the magnification control 170 causes indications on the front focal plane, if any, to appear larger or smaller through the riflescope 100 depending on which way the magnification control is operated. Embodiments of the invention may include indicators that are physically located on either of the front of the front or rear focal plane. Carrying a light signal to the front focal plane may include using a longer flexible circuit 250 than illustrated in FIG. 6B, or by using longer light guides, such as the CCW light guide 216 illustrated in FIG. 7. In this manner the indicator signal may be physically located anywhere within the field of view through the riflescope 100 as the user is looking through the riflescope.

In yet other embodiments the cant indicator need not be a visual indicator, but may instead (or in addition to) include a haptic or an aural indicator. With reference to FIGS. 9 and 10, in such systems only minor modifications to the LED driving circuit need be made. For the haptic indicator embodiment, the Center, CCW and CW LEDs 214, 234, 224 may be replaced by or operated in conjunction with a haptic generator, such as a vibratory motor. A switch may be placed in a position that allows the user to operate it while the user is simultaneously looking through the riflescope 100. For example, the switch may be located near the trigger of the firearm, or further down the barrel in a position where the switch may be operated by the hand used to support the firearm. When the switch is depressed, the inclinometer 270 and controller 240 operate as described above, detecting the rotation about the z-axis of the firearm. A haptic signal is then generated in response to the switch press. Particular haptic patterns may indicate various amounts or directions of rotation. For example, a short vibration may indicate CW rotation, two short vibrations may indicate CCW rotation, and a long vibration may indicate that the riflescope 100 is vertically aligned. A similar system may be used with the cant indicator generating an aural feedback. In an example aural system, a short chirp of a piezo-electric speaker may indicate CW rotation, a two chirp signal indicates CCW rotation, and a long chirp indicates that the riflescope 100 is vertically aligned. In some embodiments any or all of these feedback systems may be employed, either in conjunction or independently operated. A selector switch or programmable setting (not illustrated) allows the user to select which and how many indicator systems, visual, haptic, or aural, will be used.

The foregoing detailed description has been presented for the purposes of illustration and description. It is not intended to be exhaustive or to limit the invention to the particular disclosed embodiments. Numerous variations and configurations will be apparent in light of this disclosure. Thus its intended that the scope of the invention be defined not be this detailed description, but rather by the claims appended hereto.

What is claimed is:

1. A direct, see-through optical system having a main optical axis extending from an ocular end to an objective end of the optical system, the main optical axis of the optical system structured to be fixedly aligned with a long axis of a shooting device, the see-through optical system comprising:
   an electronic inclinometer structured to determine a cant of the shooting device relative to a vertical transverse axis of the main optical axis of the optical system; and
   an electronic indicator structured to provide an indicator signal to a user related to the determined cant, including:
      a first light indicator disposed adjacent a periphery of the optical system structured to be selectively illuminated to indicate a cant in a first direction; and
      a second light indicator disposed adjacent the perimeter of the optical system structured to be selectively illuminated to indicate a cant in a second direction, the first and second light indicators each located on opposite sides of the vertical transverse axis and along a horizontal axis of the optical system.

2. The see-through optical system of claim 1, further comprising a third indicator for indicating a vertical alignment of the shooting device with the optical system.

3. The see-through optical system of claim 1, in which the optical system is housed in a telescopic sighting device having a front focal plane and a rear focal plane, and in which the first or second indicator is located proximate the front focal plane of the telescopic sighting device.

4. The see-through optical system of claim 3, in which the telescopic sighting device includes an eyepiece, and in which the first or second indicator is located proximate the eyepiece.

5. The see-through optical system of claim 1, in which the optical system is housed in a telescopic sighting device having a front focal plane and a rear focal plane, and in which the first or second indicator is located proximate the rear focal plane of the telescopic sighting device.

6. The see-through optical system of claim 5, in which a reticle is disposed proximate the front focal plane, and in which the first or second indicator is located on a field stop proximate the rear focal plane.

7. The see-through optical system of claim 2, in which the third indicator is disposed between the first indicator and the second indicator.

8. The see-through optical system of claim 1, in which the electronic indicator comprises more than two individual indicators.

9. The see-through optical system of claim 1, in which the electronic indicator is structured to indicate a direction of cant and a relative amount of cant.

10. The see-through optical system of claim 1, in which the relative amount of cant is indicated by a flashing rate of the electronic indicator.

11. The see-through optical system of claim 1, in which the relative amount of cant is indicated by a light intensity of the electronic indicator.

12. The see-through optical system of claim 1, in which the electronic indicator is structured to indicate a vertical alignment of the shooting device with the optical system by illuminating both the first and second indicator.

13. The see-through optical system of claim 1, in which the electronic indicator includes a haptic indicator.

14. The see-through optical system of claim 1, in which the electronic indicator includes an aural system.

15. The see-through optical system of claim 1, in which the electronic inclinometer is an accelerometer.

16. The see-through optical system of claim 1, in which the first direction is clockwise and the second direction is counter-clockwise.

* * * * *